United States Patent
Op't Roodt et al.

(10) Patent No.: US 9,421,948 B2
(45) Date of Patent: *Aug. 23, 2016

(54) WIPER BLADE

(71) Applicant: Robert Bosch GmbH, Stuttgart (DE)

(72) Inventors: Inigo Op't Roodt, Hasselt (BE); David Van Baelen, Winksele (BE)

(73) Assignee: Robert Bosch GmbH, Stuttgart (DE)

( * ) Notice: Subject to any disclaimer, the term of this patent is extended or adjusted under 35 U.S.C. 154(b) by 271 days.

This patent is subject to a terminal disclaimer.

(21) Appl. No.: 14/053,123

(22) Filed: Oct. 14, 2013

(65) Prior Publication Data
US 2014/0053360 A1   Feb. 27, 2014

Related U.S. Application Data

(63) Continuation of application No. 12/516,852, filed as application No. PCT/EP2007/060679 on Oct. 9, 2007, now Pat. No. 8,661,602.

(30) Foreign Application Priority Data

Dec. 4, 2006  (DE) .......................... 10 2006 057 024

(51) Int. Cl.
   *B60S 1/38*   (2006.01)
(52) U.S. Cl.
   CPC ........ *B60S 1/3801* (2013.01); *B60S 2001/3815* (2013.01)
(58) Field of Classification Search
   CPC ................ B60S 2001/3813; B60S 2001/3815; B60S 1/3801
   USPC ......................................... 15/250.46, 250.44
   See application file for complete search history.

(56) References Cited

U.S. PATENT DOCUMENTS

| | | |
|---|---|---|
| 2,807,821 A | 10/1957 | Scinta |
| 3,816,870 A | 6/1974 | Riester |
| 3,935,612 A | 2/1976 | Wittwer |
| 4,418,441 A | 12/1983 | Van Den Berg |
| 4,675,934 A | 6/1987 | Dal Palu |
| 4,794,664 A | 1/1989 | Arai |
| 6,820,304 B1 | 11/2004 | Gossez et al. |
| 6,973,697 B2 | 12/2005 | Shen |

FOREIGN PATENT DOCUMENTS

| | | |
|---|---|---|
| EP | 0578563 | 1/1994 |
| WO | 01/30621 | 5/2001 |

OTHER PUBLICATIONS

International Search Report for Application No. PCT/EP2007/060679 dated Dec. 18, 2007 (English Translation, 2 pages).

*Primary Examiner* — Gary Graham
(74) *Attorney, Agent, or Firm* — Michael Best & Friedrich LLP

(57) ABSTRACT

The invention is based on a wiper blade (10) with a supporting bracket system which can be connected to a wiper arm in an articulated manner and has at least one main bracket (12, 24) and a plurality of secondary brackets (24, 28) which are connected pivotably to one another by means of joints (20, 26), wherein, in the region of at least one joint (20, 26), the main bracket (12, 24) has a U-shaped cross-sectional profile, the side walls (18, 44) of which laterally enclose the secondary brackets (24, 28), and, on the insides of the side walls (44), has pivots (50) which, together with lateral clip cutouts (54) on the secondary bracket (28), form a clip connection and a bearing point, while the secondary bracket (28) is supported via a rolling bearing (34, 66) on a top wall (58) of the main bracket (24). It is proposed that the pair of brackets (12, 24 or 24, 28), which in this way are connected to each other in an articulated manner, is manufactured from plastic in an injection-moulding process, with the pivots (50) being integrally cast on the insides of the side walls (18, 44) of the main bracket (18, 24).

10 Claims, 3 Drawing Sheets

ABBR# WIPER BLADE

BACKGROUND OF THE INVENTION

The invention is based on a wiper blade.

DE 85 15 052 U1 discloses a wiper blade of the type in question. The supporting bracket system has a main bracket as the superordinate bracket, which is connected in an articulated manner to an intermediate bracket as the subordinate bracket. On the other hand, the intermediate bracket likewise serves as a superordinate bracket with respect to a claw bracket which is connected in an articulated manner to the intermediate bracket and constitutes a subordinate bracket thereto. In this case, the superordinate bracket and the subordinate bracket are manufactured from sheet metal. They are connected to each other in an articulated manner by a plastic connecting piece. For this purpose, the side walls of the connecting piece have spring tongues, the outer sides of which have projecting sections with which said spring tongues latch in openings in the side walls of the superordinate bracket during installation. Bearing pins are arranged on the insides, lying opposite the projecting sections, said bearing pins latching into openings in the side walls of the subordinate bracket during the installation of the subordinate bracket. To simplify the installation, the bearing pins have installation slopes toward the open side of the U-shaped cross sectional profile. The connecting piece furthermore has, lying on the inside and integrally formed on its top wall, a curved bead which serves as a rolling bearing for the subordinate bracket, and on which the latter is supported. Via the rolling bearing, the main contact pressure forces of the wiper blade are transmitted by the wiper arm to the wiper strip while the bearing pins absorb the smaller forces in the opposite direction. The diversity of components results in high production costs. Furthermore, the openings in the side walls of the superordinate profile interfere with the visual impression of the wiper blade.

Furthermore, EP 0 578 563 B1 discloses a wiper blade with a supporting bracket system which has, as the superordinate bracket, a main bracket, the ends of which are each connected in an articulated manner to a claw bracket as the subordinate bracket. The main bracket and the claw brackets are produced from plastic by compression molding. At the ends, the main bracket has projecting spring tongues with bearing bores, the spring tongues engaging in a cavity of the claw bracket. During the installation, corresponding bearing pins of the claw bracket latch into the bearing bores. The bearing pins are arranged on the inside of a cutout of the claw bracket and have installation slopes in order to simplify the installation. For lateral guidance of the claw brackets, transverse webs which run transversely with respect to the longitudinal direction of the main bracket are provided on both sides of the bearing bores. In addition, a pin is arranged in the longitudinal direction in a manner offset with respect to the center of the main bracket, the pin engaging in a cavity of the claw bracket and serving for additional guidance in particular transversely with respect to the longitudinal direction of the main bracket.

SUMMARY OF THE INVENTION

According to the invention, the pair of brackets which is interconnected in an articulated manner in this way is manufactured from plastic by injection molding, with the pivots being integrally cast on the insides of the side walls of the superordinate bracket. The design according to the invention means that no annoying functional elements, for example cutouts for bearing openings or clip connections, are visible on the outsides in the region of the joints. Furthermore, the diversity of components and the manufacturing costs are reduced. At the same time, a stable joint which can transmit large contact pressure forces via a bearing bridge designed as a rolling bearing is produced.

To simplify the manufacturing, the subordinate bracket has a demolding cutout joining the clip cutout toward the open side of the U-shaped cross sectional profile of the superordinate bracket. This results overall in an elongated cutout which is closed on one side in the region of the clip cutout while it is open on the opposite side. For the lateral guidance of the subordinate bracket, the clip cutout and the demolding cutout are bordered by guide surfaces which can also be part of guide ribs and are supported on the inner surfaces of the side walls of the superordinate bracket.

To improve the lateral guidance of the subordinate bracket, it may furthermore be expedient for the superordinate bracket to have an additional bearing, for example in the form of a pin or a rib, which is integrally formed on the inside of its top wall. The additional bearing engages in a depression in the subordinate bracket, as a result of which the latter is guided precisely in particular transversely with respect to the longitudinal direction of the wiper blade. For better demolding of the superordinate bracket from the injection mold, demolding holes are provided in the region of its pivots in its top wall.

To facilitate the installation, it is expedient for the edges of the subordinate bracket, which edges face the top wall of the superordinate bracket, to have installation slopes. It accordingly holds true for the pivots of the superordinate brackets that they likewise have installation slopes toward the open side of the U-shaped cross sectional profile.

In order to optimize the dimensional stability of the entire wiper blade with little material being used, it may be advantageous, in the case of a wiper blade with a main bracket, two intermediate brackets and two claw brackets, to manufacture the main bracket from sheet metal while the intermediate brackets and the claw brackets are manufactured from plastic by injection molding.

The articulated connection according to the invention of the brackets of a supporting bracket system to one another can also be used for the articulated connection between the wiper blade and a wiper arm to which the wiper blade is connected in an articulated manner. For this purpose, the wiper blade has a cross sectional profile of a subordinate bracket in the region of the mounting box, and, at its associated end, the associated wiper arm has the matching cross sectional profile of a superordinate bracket.

BRIEF DESCRIPTION OF THE DRAWINGS

Further advantages emerge from the description below of the drawing. The drawing illustrates exemplary embodiments of the invention. The drawing, the description and the claims contain numerous features in combination. A person skilled in the art will expediently also consider the features individually and put them together to form meaningful further combinations.

In the drawing.

DETAILED DESCRIPTION

Figure 1:
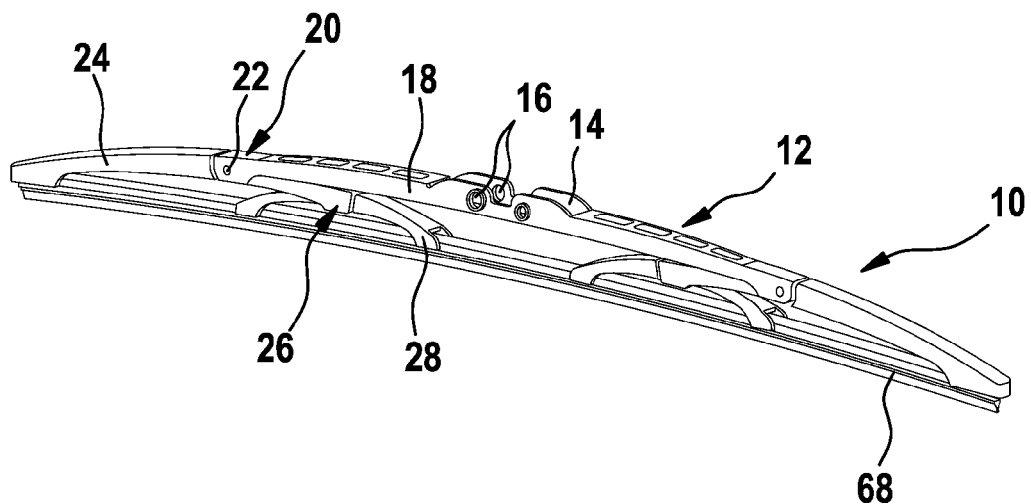
FIG. 1 shows a perspective view of a wiper blade.
Figure 2:
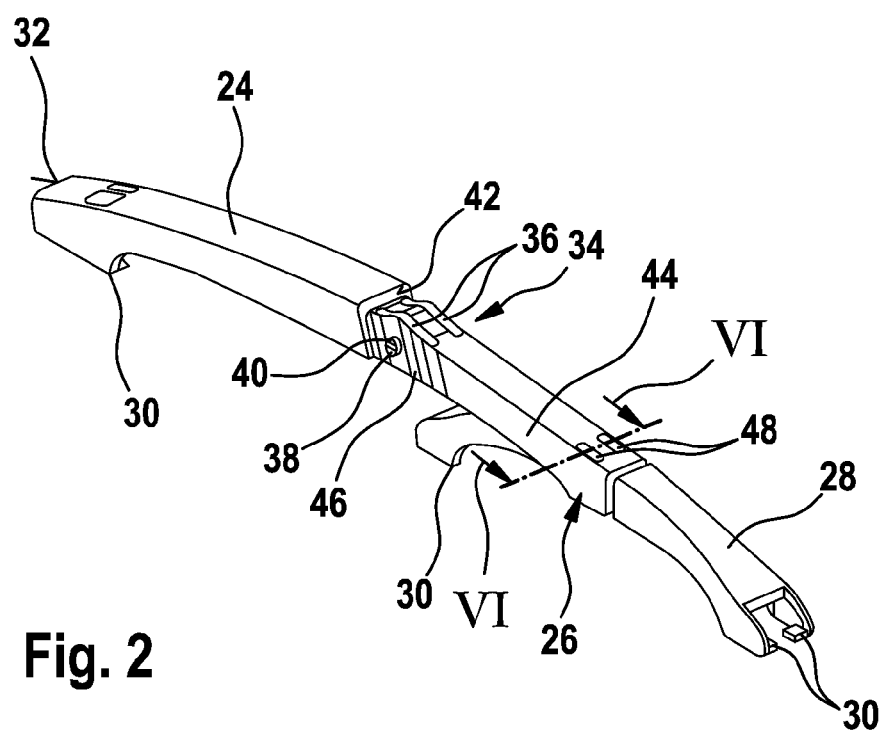
FIG. 2 shows a perspective view of an intermediate bracket with a claw bracket.
Figure 3:
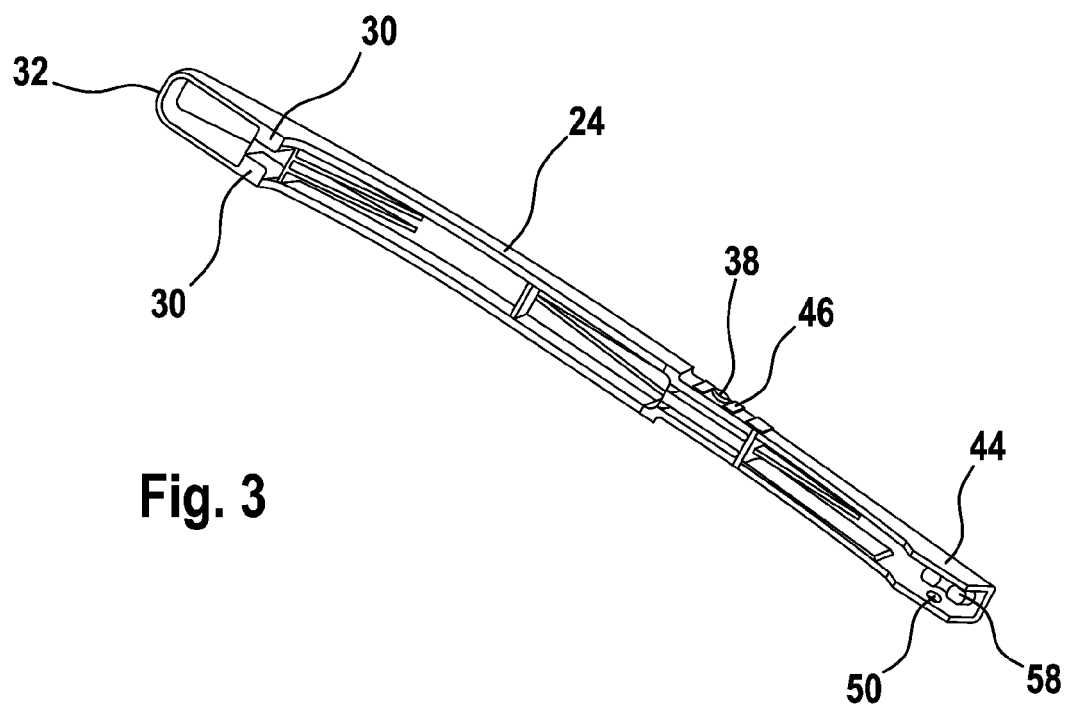
FIG. 3 shows a perspective view of an intermediate bracket.
Figure 4:
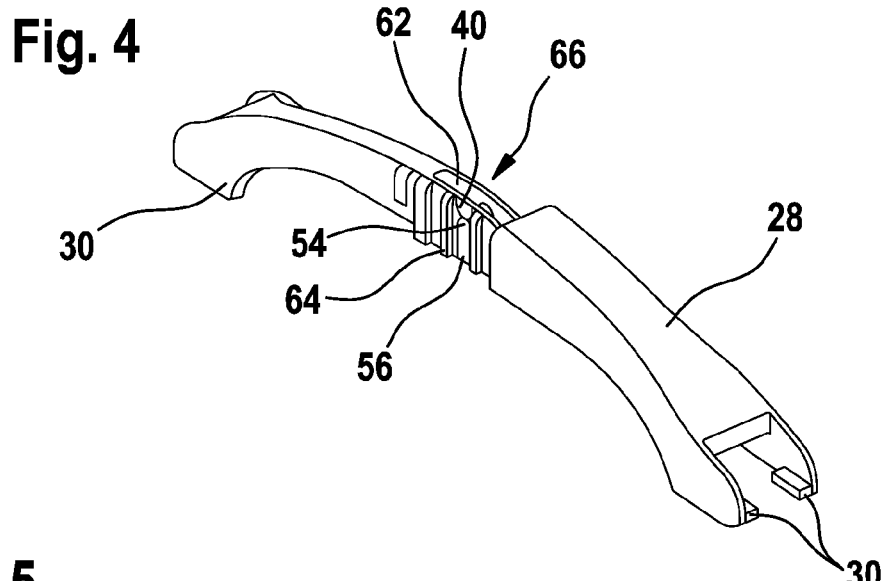
FIG. 4 to FIG. 5 show perspective views of a claw bracket.
Figure 5:
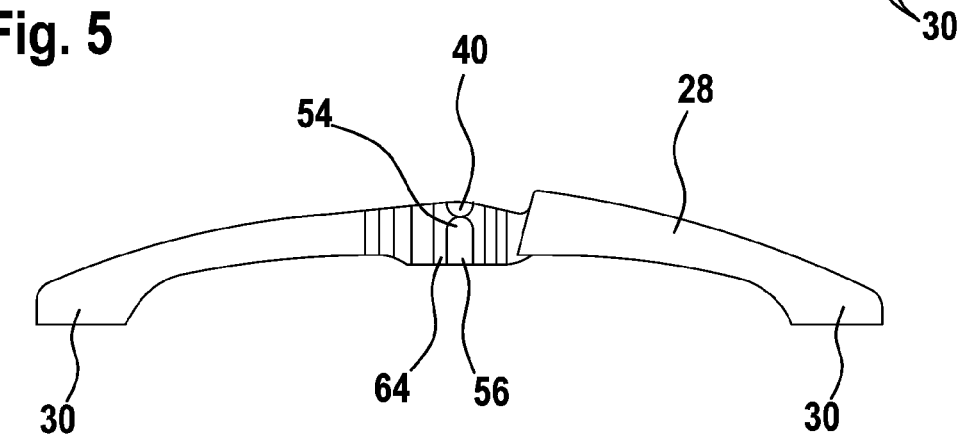

A wiper blade 10 comprises a main bracket 12, two intermediate brackets 24 and two claw brackets 28. The intermediate brackets 24 act as subordinate brackets in relation to the main bracket 12 while they should be regarded as superordinate brackets in relation to the claw brackets 28. Accordingly, the main bracket 12 is a superordinate bracket to the intermediate brackets 24 while the claw brackets 28 constitute subordinate brackets to the intermediate brackets 24. Joints 20 connect the main bracket 12 in an articulated manner to the intermediate brackets 24 while joints 26 connect the intermediate brackets 24 in an articulated manner to the claw brackets 28.

In the embodiment according to FIG. 1, the main bracket 12 is manufactured from sheet metal while the intermediate brackets 24 and the claw brackets 28 are plastic parts. In this case, the joints 20 and 26 differ. The joint 20 is formed by bearing openings 22 in the side walls 18 of the main bracket 12 and by pivots 38 which latch into the bearing openings 22 during the installation. To facilitate the installation, the pivots 38 have installation slopes 40 in the installation direction. A mounting box 14, in the side walls of which eyelets 16 for a bearing pin (not illustrated) are arranged, is provided in the central region of the main bracket 12.

In principle, the main bracket 12 can also be produced from plastic by injection molding. In this case, the joint 20 is designed in the same manner as the joint 26.

In the region of the pivot 38, the intermediate bracket 24 is designed as a bearing bridge 34 with bearing ribs 36 running in the longitudinal direction. Adjoining the bearing bridge 34 toward the end wall 32, a stop surface 42, which is formed by a border, limits the pivoting movement of the intermediate bracket 24. The bearing ribs 36 form a rolling bearing and are supported under load on a top wall of the main bracket 12 while the forces in the opposite direction are absorbed by the pivots 38. For the transverse guidance of the intermediate bracket 24, guide surfaces 46 which may be part of guide ribs are arranged to the side of the bearing pins 38.

The end walls 32 of the intermediate brackets 24, which end walls face the inner and outer ends of the wiper blade 10, are closed and fix a wiper strip 68 in the longitudinal direction. The intermediate brackets 24 have, offset inward with respect to the end walls 32, claws 30 with which they hold the wiper strips 60 transversely with respect to the longitudinal direction. In addition, the wiper strip 68 is held on the claw brackets 28 by claws 30.

At the ends of the intermediate brackets 24 opposite the end walls 32, said intermediate brackets have a cross sectionally U-shaped cross sectional profile which is formed by side walls 44 and a top wall 58. The joint 26 is located within said U-shaped profile. It is firstly formed by pivots 50 which latch into clip cutouts 54 of the side surfaces of the claw bracket 28 and secondly by a bearing bridge 66 which is designed as a rolling bearing and is supported on the inside of the top wall 58 of the intermediate bracket 24. The bearing play at the pivots 50 is dimensioned in such a manner that, under the contact pressure force exerted by a wiper arm, the forces are transmitted via the bearing bridge 66 while the claw bracket 28 is supported in the opposite direction on the pivots 50.

The pivots 50 are integrally formed on the insides of the side walls 44 of the intermediate bracket 24 such that the visible surfaces 52 on the outer sides of the side walls can be formed smoothly and free from functional features. For better demolding of the claw brackets 28, they have demolding cutouts 56 as an extension of the clip cutouts 54 toward the open side of the U-shaped cross sectional profile. For the same purpose, demolding holes 48, which are provided in the region of the pivots 50 in the top wall 58, are used for better demolding of the intermediate bracket 24. In the direct vicinity of the clip cutouts 54 and the demolding cutouts 56 there are guide surfaces 64 which can be part of guide ribs and serve for guiding the claw bracket 28.

Figure 6:
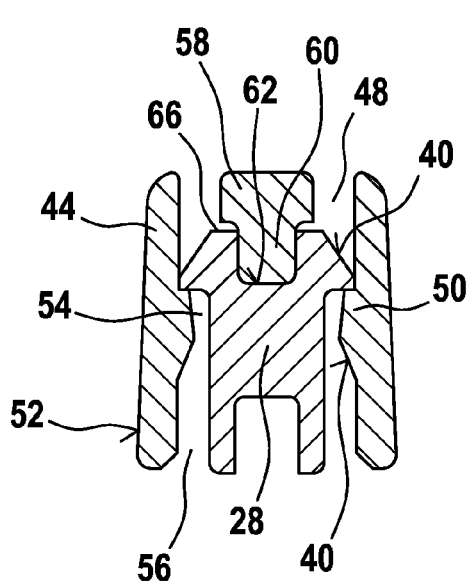
FIG. 6 shows a cross section corresponding to the line VI-VI in FIG. 2.
Figure 7:
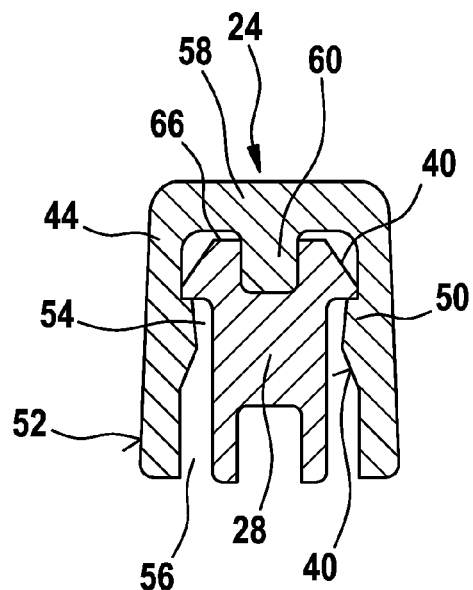
FIG. 7 to FIG. 9 show variants to FIG. 6.

In the embodiment according to FIG. 6, the intermediate bracket 28 has an additional bearing 60 which is integrally formed on the top wall 58 and engages in a depression 62 in the claw bracket 28. The additional bearing 60, which can be designed as a pin or as a rib, guides the claw bracket 28 in particular transversely with respect to the longitudinal direction of the wiper blade 10. In the embodiment according to FIG. 7, the demolding holes 48 have been omitted. This is possible inter alia if the additional bearing 60 is offset with respect to the pivots 50 in the longitudinal direction of the intermediate bracket.

Figure 8:
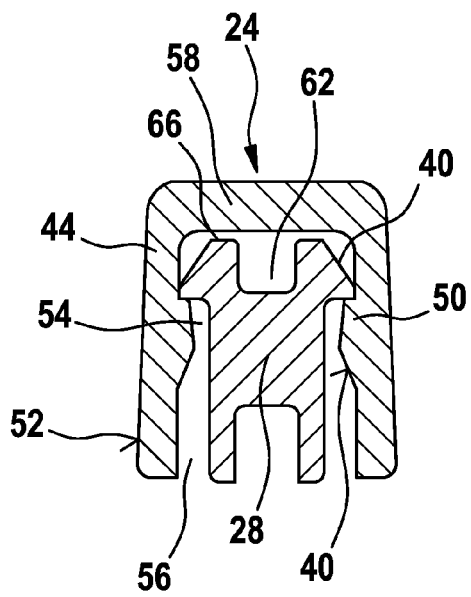
Figure 9:
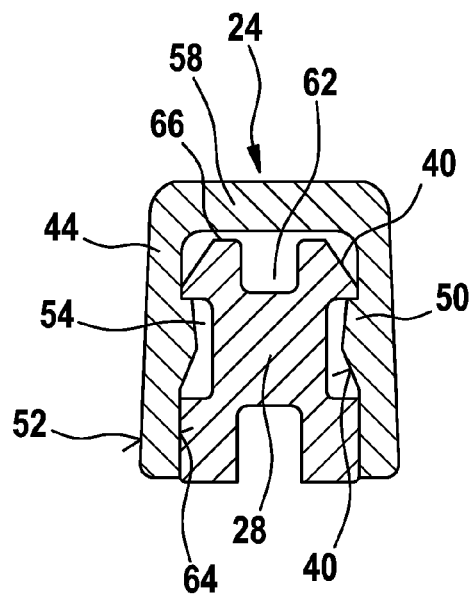

The additional bearing 60 has been omitted in the embodiment according to FIG. 8, and the demolding cutouts 56 have been omitted in the embodiment according to FIG. 9. These measures simplify the construction of the joint 26, and smaller manufacturing tolerances have to be taken into consideration.

What is claimed is:

1. A wiper blade (10) with a supporting bracket system which is connectable to a wiper arm in an articulated manner, the wiper blade (10) comprising:
    at least one superordinate bracket (12, 24) and a plurality of subordinate brackets (24, 28) which are connected pivotably to one another by joints (20, 26), wherein, in a region of at least one joint (20, 26), the superordinate bracket (12, 24) has a U-shaped cross sectional profile, side walls (18, 44) of which laterally enclose the subordinate bracket (24, 28), and, on insides of the side walls (44), has pivots (50) which, together with lateral clip cutouts (54) on the subordinate bracket (28), form a clip connection and a bearing point while the subordinate bracket (28) is supported via a rolling bearing (34, 66) on a top wall (58) of the superordinate bracket (24),
    characterized in that at least one of the superordinate bracket and the subordinate brackets is manufactured from plastic by injection molding, with the pivots (50) being integrally cast on the insides of the side walls (18, 44) of the superordinate bracket (18, 24), wherein the superordinate bracket (12, 24) has demolding holes (48) in the region of its pivots (50) in its top wall (58), and wherein lateral edges of the subordinate bracket (24, 28), which edges face the top wall (58) of the superordinate bracket (12, 24), have installation slopes (40).

2. The wiper blade (10) as claimed in claim 1, characterized in that the subordinate bracket (24, 28) has a demolding cutout (56) joining the clip cutout (54) toward the open side of the U-shaped cross sectional profile of the superordinate bracket (12, 24).

3. The wiper blade (10) as claimed in claim 2, characterized in that the clip cutout (54) and the demolding cutout (56) are bordered by guide surfaces (46).

4. The wiper blade (10) as claimed in claim 1, characterized in that the clip cutout (54) and the demolding cutout (56) are bordered by guide surfaces (46).

5. The wiper blade (10) as claimed in claim 1, characterized in that the superordinate bracket (12, 24) has an additional bearing (60) which is integrally formed on the inside of its top wall (58) and engages in a depression (62) in the subordinate bracket (24, 28).

6. The wiper blade (10) as claimed in claim 1, characterized in that the pivots (50) of the superordinate brackets (12, 24) have installation slopes (40) toward the open side of the U-shaped cross sectional profile.

7. The wiper blade (10) as claimed in claim 1, wherein the at least one superordinate bracket (12, 24) includes a main bracket (12), and wherein the plurality of subordinate brackets (24, 28) includes two intermediate brackets (24) and two claw brackets (28), characterized in that the main bracket (12) is manufactured from sheet metal while the intermediate brackets (24) and the claw brackets (28) are plastic parts.

8. The wiper blade (10) as claimed in claim 1, characterized in that the wiper blade (10) has a cross sectional profile of a subordinate bracket (24, 28) in a region of a mounting box (14), and an associated wiper arm has a matching cross sectional profile of a superordinate bracket (18, 24).

9. The wiper blade (10) as claimed in claim 1, characterized in that both of the superordinate bracket (24) and the subordinate bracket (28) are manufactured from plastic by injection molding.

10. The wiper blade (10) as claimed in claim 1, characterized in that outer surfaces (52) of the side walls (44) opposite the pivots (50) are smooth and free from functional features.

* * * * *